US011310241B2

(12) United States Patent
Srinivasan et al.

(10) Patent No.: US 11,310,241 B2
(45) Date of Patent: Apr. 19, 2022

(54) MIRRORING VIRTUAL NETWORK TRAFFIC

(71) Applicant: MICROSOFT TECHNOLOGY LICENSING, LLC, Redmond, WA (US)

(72) Inventors: Chandrasekar Srinivasan, Bellevue, WA (US); Neha Aggarwal, Seattle, WA (US); Deven Jagasia, Kirkland, WA (US); Fengfen Liu, Sammamish, WA (US); Karthik Ananthakrishnan, Redmond, WA (US); Avijit Gupta, Redmond, WA (US); Ganesh Srinivasan, Redmond, WA (US); Nisheeth Srivastava, Redmond, WA (US); Rishabh Tewari, Sammamish, WA (US); Michal Czeslaw Zygmunt, Bellevue, WA (US); Harish Kumar Chandrappa, Bothell, WA (US); Gabriel Silva, Redmond, WA (US); Naveen Prabhat, Redmond, WA (US); Sumit Sharad Dhoble, Redmond, WA (US); Xinyan Zan, Sammamish, WA (US); Maitrey Kumar, Redmond, WA (US); Wei Xia, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 628 days.

(21) Appl. No.: 16/233,981

(22) Filed: Dec. 27, 2018

(65) Prior Publication Data
US 2020/0092299 A1 Mar. 19, 2020

Related U.S. Application Data

(60) Provisional application No. 62/732,972, filed on Sep. 18, 2018.

(51) Int. Cl.
*H04L 29/06* (2006.01)
*G06F 9/455* (2018.01)
(Continued)

(52) U.S. Cl.
CPC ........ *H04L 63/105* (2013.01); *G06F 9/45558* (2013.01); *G06F 9/547* (2013.01);
(Continued)

(58) Field of Classification Search
CPC .............. H04L 63/1425; H04L 63/105; H04L 63/0236; H04L 67/1095; H04L 63/104;
(Continued)

(56) References Cited

U.S. PATENT DOCUMENTS 8,850,571 B2   9/2014   Staniford et al.
9,203,711 B2   12/2015  Agarwal et al.
(Continued)

OTHER PUBLICATIONS

Rao, Anil, "Tap-as-a-Service: Enabling Traffic Monitoring in OpenStack Clouds", Retrieved from https://blog.gigamon.com/2015/10/26/tap-as-a-service-enabling-traffic-monitoring-in-openstack-clouds-2/, Oct. 26, 2015, 3 Pages.

(Continued)

*Primary Examiner* — Tri M Tran
(74) *Attorney, Agent, or Firm* — Jacob P. Rohwer; Newport IP, LLC

(57) ABSTRACT

The disclosed system implements techniques to enable a tenant of a cloud-based platform to effectively and efficiently apply a policy that copies data packets communicated to or from a virtual machine in the tenant's own virtual network. When applied, the policy mirrors data traffic associated with a workload executing on a virtual machine in the tenant's virtual network. To mirror the data traffic, a copy of a data packet is streamed to another virtual machine so that network analytics can be performed (e.g., performance ana- (Continued)

lytics, security analytics, etc.). In various examples, the policy can be a role-based mirroring policy that defines a plurality of roles in association with a role-based access model that scales operations and that provides improved security for a tenant's virtual network.

20 Claims, 9 Drawing Sheets

(51) Int. Cl.
*G06F 9/54* (2006.01)
*H04L 67/1095* (2022.01)
*H04L 41/14* (2022.01)

(52) U.S. Cl.
CPC .......... *H04L 63/1425* (2013.01); *H04L 63/20* (2013.01); *H04L 67/1095* (2013.01); *G06F 2009/45587* (2013.01); *G06F 2009/45591* (2013.01); *G06F 2009/45595* (2013.01); *H04L 41/14* (2013.01)

(58) Field of Classification Search
CPC ... H04L 63/0263; H04L 43/026; H04L 63/20; H04L 41/14; H04L 43/12; G06F 9/5077; G06F 2009/45595; G06F 21/552; G06F 9/54; G06F 21/53; G06F 2009/45587; G06F 9/547; G06F 9/45558; G06F 2209/542; G06F 2009/45591; G06F 2209/508; G06F 2221/2141

See application file for complete search history.

(56) References Cited

U.S. PATENT DOCUMENTS

| | | | |
|---|---|---|---|
| 9,912,536 B2 | 3/2018 | McDaniel et al. | |
| 9,961,105 B2 | 5/2018 | Nanda et al. | |
| 9,967,165 B2 | 5/2018 | Arora et al. | |
| 2013/0343181 A1* | 12/2013 | Stroud | H04L 69/22 370/229 |
| 2014/0196104 A1* | 7/2014 | Chari | H04L 63/20 726/1 |
| 2016/0182336 A1* | 6/2016 | Doctor | H04L 43/062 709/224 |
| 2017/0094002 A1 | 3/2017 | Kumar et al. | |
| 2017/0118102 A1 | 4/2017 | Majumder et al. | |
| 2017/0155672 A1* | 6/2017 | Muthukrishnan | H04L 63/1425 |
| 2018/0115470 A1* | 4/2018 | Huang | H04L 41/0873 |

OTHER PUBLICATIONS

"International Search Report and Written Opinion Issued in PCT Application No. PCT/US19/039933", dated Sep. 13, 2019, 12 Pages.

* cited by examiner

MIRRORING VIRTUAL NETWORK TRAFFIC

PRIORITY APPLICATION

This application claims the benefit of and priority to U.S. Provisional Application No. 62/732,972, filed Sep. 18, 2018, the entire contents of which are incorporated herein by reference.

BACKGROUND

Cloud-based platforms (e.g., AMAZON WEB SERVICES, MICROSOFT AZURE, etc.) enable tenants (e.g., customers) to consume resources and/or execute workloads on their virtual networks and virtual machines. However, these cloud-based platforms do not provide an effective and/or an efficient means for a tenant to monitor the performance of virtual machines within a tenant's own virtual network.

Conventionally, a tenant has to deploy their own functionality to monitor for, and collect, networking information associated with virtual machines operating in the tenant's own virtual network. The responsibility of deploying their own functionality to monitor for, and collect, networking information associated with virtual machines operating in the tenant's own virtual network places a burden on the tenant, and furthermore, can affect the performance of a virtual machine being monitored.

It is with respect to these and other technical challenges that the disclosure made herein is presented.

SUMMARY

The techniques described herein enable a tenant of a cloud-based platform (e.g., a cloud service provider) to effectively and efficiently apply a policy that copies data packets communicated to or from a virtual machine in the tenant's own virtual network (e.g., VNET) being hosted by the cloud-based platform. When applied, the policy mirrors data traffic associated with a workload executing on one or more virtual machines in the tenant's virtual network. To mirror the data traffic, a copy of a data packet is created and streamed, or transmitted, to another virtual machine so that network analytics can be performed (e.g., performance analytics, security analytics, etc.). By offloading the network analytics from the virtual machine executing the workload to another virtual machine, performance of the workload is not disrupted. The other virtual machine may be a virtual machine that is part of the tenant's virtual network. Alternatively, the other virtual machine may be part of a virtual network operated by the cloud-based platform.

As described herein, the cloud-based platform can expose an application programming interface (API) to receive a remote call from a tenant requesting that the policy be applied to one or more virtual machines in the tenant's virtual network. The policy can be useable to define an intended state (e.g., a goal state) for the tenant's virtual network. To apply the policy, the cloud-based platform includes a scalable software-defined network (SDN) controller to configure a networking component to copy data packets communicated to and/or from the virtual machine in the tenant's virtual network. Stated another way, the SDN controller can activate a "virtual" tap and the virtual tap is configured to monitor workload data traffic at the virtual machine.

The networking component that is configured to copy the data packets, in association with application of the policy, is part of a host node of the cloud-based platform that supports the virtual machine. For example, the networking component can include a software defined networking switch (e.g., a vSwitch), a network interface controller (NIC), a Field-Programmable Gate Array (FPGA), of a combination of these components. These networking components are fully controlled by the cloud-based platform, and thus, implementation of the mirroring functionality does not affect the performance of the virtual machine that has been tapped.

The networking component can determine that an individual data packet has been communicated to or from the virtual machine in the tenant's virtual network. Based on this determination, the networking component can create a copy of the individual data packet that is communicated to or from the virtual machine. Once created, the copy of the data packet is streamed to another virtual machine in the tenant's virtual network, or in a virtual network hosted and operated by the cloud-based platform, so network analytics can be performed on the workload data traffic.

As a result of the techniques described herein, responsibility for implementing the mirroring functionality, or the virtual tap, is offloaded to components of the cloud-based platform. The tenant no longer has to deploy their own functionality if the tenant wants to monitor for, and collect, network information associated with virtual machines operating in the tenant's own virtual network.

In various examples, the policy can be a role-based mirroring policy and the API receives the remote call from a tenant in association with a tenant subscription that enables the role-based mirroring policy to be applied. The role-based mirroring policy can enable a tenant to define a plurality of roles in association with a role-based access model that scales operations and that also provides improved security. For instance, a first role can enable a first user to execute a workload on the virtual machine, the workload causing data packets to be communicated to or from the virtual machine. The first user may be an "owner" of the virtual machine, and thus, the first user is authorized to execute the workloads. Moreover, a second role can enable a second user (e.g., a security agent, an information technology (IT) agent, etc.) to monitor the workload being executed by the first user. This role-based access model restricts implementation of the mirroring functionality to a particular role that is authorized to listen to workload data traffic and to perform network analytics. In various examples, the role-based access model gives the second user authority to apply the mirroring policy regardless of any policy (e.g., a defined access control list) the first user establishes to prohibit a virtual tap from being applied.

Consequently, the techniques described herein provide authorized visibility into workloads for analytics operations of a tenant. State another way, the tenant subscription can intentionally define that a first user's workload can be monitored by a second user for security and/or performance reasons. To this end, the remote call requesting application of the policy can include user information associated with a user requesting application of the policy. Before configuring the networking component to apply the policy, the cloud-based platform can evaluate the user information to verify that the user requesting application of the policy is authorized in association with a defined role.

In various examples, the remote call received from the tenant can specify an identifier for the virtual machine to be tapped, such that the policy is applied to all the data packets communicated to or from the virtual machine. The virtual machine may have multiple virtual NICs and each virtual NIC can have one or more Internet Protocol (IP) addresses, all of which are tapped if the identifier specifies the virtual machine as a whole.

In additional or alternative examples, the remote call received from the tenant can specify an identifier for a virtual NIC of the virtual machine to be tapped, such that the policy is applied to the data packets communicated to or from the virtual machine via a specific virtual NIC associated with the identifier (e.g., other virtual NICs of the virtual machine may not be tapped).

In additional or alternative examples, the remote call received from the tenant can specify an identifier for a collection of Internet Protocol (IP) addresses (e.g., a subnet of the tenant's virtual network) of the virtual machine to be tapped, such that the policy is applied to the data packets communicated to or from the virtual machine via any one of the collection of IP addresses. In some scenarios, the collection of IP addresses is an extension of an IP address space used in a private network (e.g., an on-premises datacenter) operated by a tenant of the cloud-based platform.

Consequently, the mirroring functionality described herein can be implemented according to various levels of granularity (e.g., the whole virtual machine, a specific virtual NIC of the virtual machine, or a collection of IP addresses, etc.). This allows for better management and/or consumption of resources. For example, resources do not have to unnecessarily be consumed to copy all the data packets communicated to and/or from the virtual machine as a whole when the tenant only wants to analyze data traffic associated with a specific vNIC of multiple different vNICs configured in association with the virtual machine.

In various examples, the policy can be configured to filter the data packets to be copied and streamed. The filter can specify that traffic flowing in a particular direction be copied (e.g., only incoming data packets or packets received by the virtual machine, only outgoing data packets or data packets sent by the virtual machine, etc.). The filter can specify a type of packet to be copied (e.g., TCP/IP data packets). The filter can specify an "N" number of bytes of a packet payload to be copied (e.g., the first one hundred bytes), and thus, the copying may not copy the whole data packet. The filter can specify that only data packets being sent to a particular destination be copied. The filter can specify that only data packets received from a particular source be copied. The filter can specify that only a header of a data packet is to be copied. It is noted that the filter can be a combination of any two or more of the conditions listed above. Resources can be saved via the filtering process because not all the data packets may need to be copied and streamed. Moreover, only part of a data packet may need to be copied and streamed.

In various examples, the mirroring functionality described herein can be implemented by a Field-Programmable Gate Array (FPGA). This can improve performance of the host node (e.g., save processor cycles) and reduce latency. A FPGA can include a hairpin routing block that is configured to determine when a data packet is received by a virtual machine and/or when a data packet is transmitted by the virtual machine. The hairpin routing block can copy the data packet and send the copy of the data packet to another virtual machine tasked with collecting data traffic so network analytics can be performed.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
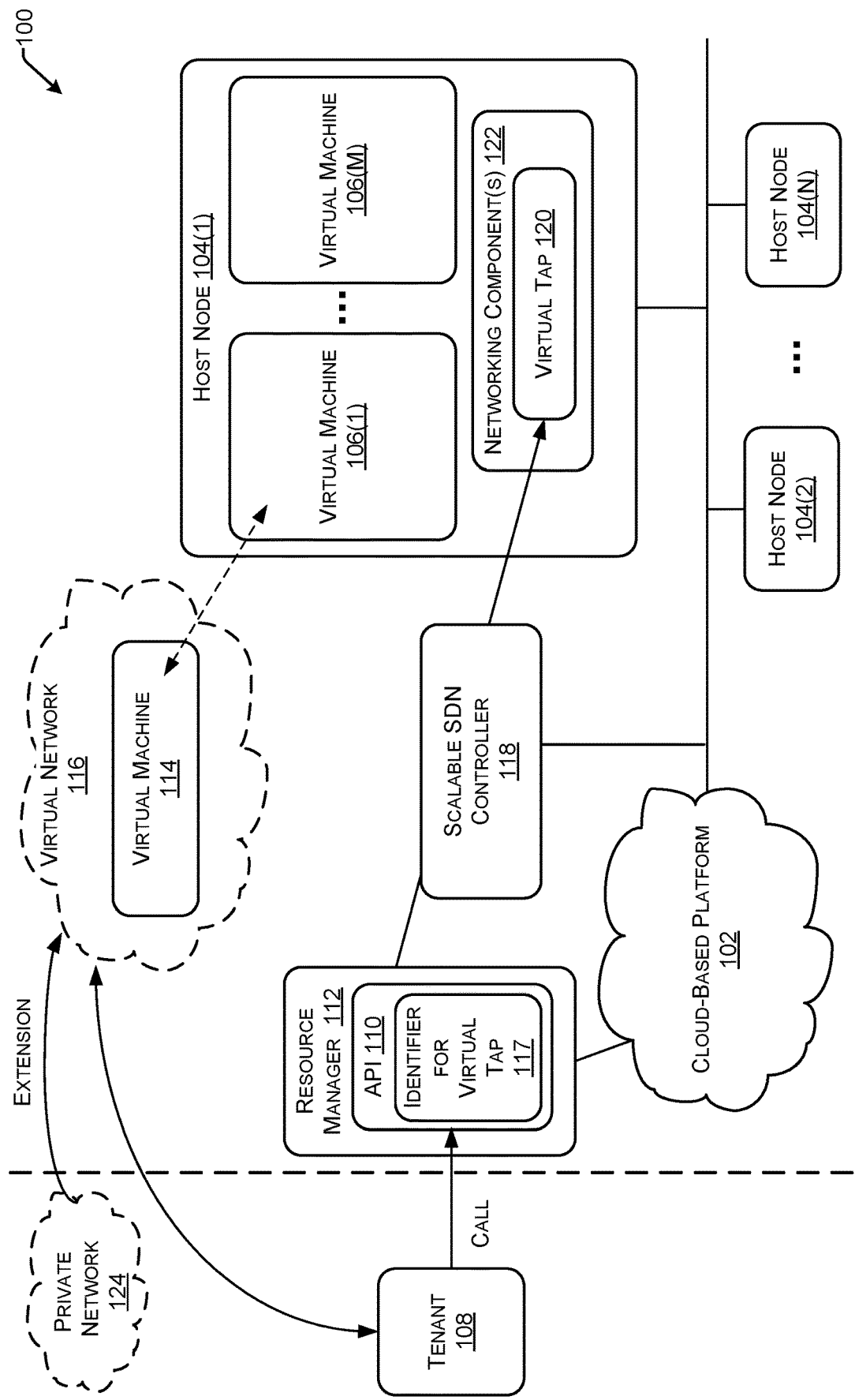
FIG. 1 is a diagram that illustrates an example environment for implementing a virtual tap that mirrors workload traffic of a virtual machine executing within a tenant's virtual network.

The techniques described herein mirror traffic from a workload that executes in a tenant's virtual network (e.g., VNET). In various examples, a virtual network is a representation of a tenant's own network in a cloud-based platform (e.g., AMAZON WEB SERVICES, MICROSOFT AZURE, etc.). In some instances, the virtual network can be an extension of the tenant's own private network (e.g., an on-premises datacenter network). A virtual network can implement one or more virtual machines. As further described herein, the cloud-based platform can provide the infrastructure to "tap" workload traffic in a virtual network. For instance, a full (e.g., deep) copy of a data packet sent to and/or transmitted from a virtual machine can be created and streamed to another virtual machine so network analytics (e.g., performance analytics, security analytics, etc.) can be performed on the workload traffic.

In various examples, a virtual machine provides functionality to execute an operating system. A hypervisor in the cloud-based platform can use the functionality to share and manage hardware, allowing for multiple isolated environments to exist on a same physical machine (e.g., a server that is part of the cloud-based platform). A physical machine that is part of the cloud-based platform may be referred to herein as a host node. In further examples, a container can exist on a virtual machine. A container is an isolated and resource-controlled operating environment.

A software application or process, which may be referred to herein as a workload, can run in a container without affecting the rest of the system and without the system affecting the application or process. A container may be specific to one application or process, or may provide the runtime for multiple applications or processes, providing additional operating system functions and services (e.g. input/output functions, security, etc.). Moreover, a container can be portable and/or mobile. Containers introduce additional levels of abstraction to a network (e.g., a datacenter network operated by a cloud-based platform), thereby increasing the complexity of the networking infrastructure. In a specific example, a host node may have a physical IP address and a virtual machine executing within the host node may have a virtual IP address. Network Virtualization Functions (NVFs) in the host node may be used to encapsulate and/or de-encapsulate ("encap/decap") data packets and/or to translate addresses from one layer of abstraction to another and/or between physical and virtual layers.

As described herein, the cloud-based platform can expose an application programming interface (API) to receive a remote call from a tenant requesting that a policy be applied to a virtual network of a tenant. The policy can be useable to define an intended state (e.g., a goal state) for the tenant's virtual network. As part of the application of the policy, a scalable software-defined network (SDN) controller can configure a component (e.g., a software defined networking switch, a network interface controller, a Field-Programmable Gate Array, etc.) of the cloud-based platform to copy data packets communicated to and/or from the virtual machine in the tenant's virtual network. That is, the SDN controller can activate a virtual tap in a host node supporting the virtual machine.

In some examples, the policy can be a role-based mirroring policy and the API receives the remote call from a tenant in association with a tenant subscription that enables the role-based mirroring policy to be applied to the data packets communicated to or from the virtual machine in the virtual network. The role-based mirroring policy can enable a tenant to define a plurality of roles. For instance, a first role can enable an owner of the virtual machine to execute a workload that causes the data packets to be communicated to or from the virtual machine (e.g., the owner may be a first person that works for a company). Moreover, a second role can enable an authorized security agent to monitor (e.g., tap) the workload (e.g., the authorized security agent may be a second person that works for the same company). Using this role-based approach provides authorized visibility into workloads for analytics operations of a tenant. For instance, workloads of a virtual machine owner are allowed to be monitored by someone else for security and/or performance reasons.

FIG. 1 is a block diagram that illustrates an example environment 100 for implementing a virtual tap that mirrors workload traffic of a virtual machine executing within a tenant's virtual network. The example environment 100 shows a cloud-based platform 102 that includes a plurality of host nodes 104(1) through 104(N) (e.g., N can represent hundreds or thousands of physical machines). An individual host node 104(1) can include one or more of virtual machines 106(1) through 106(M) (e.g., M can represent one, two, three, five, ten, twenty, and so forth).

A tenant 108 can make a call into an application programming interface 110 exposed via a resource manager 112 of the cloud-based platform 102. As described above, the tenant 108 can request that a policy be applied to a virtual machine 114 executing a workload in the tenant's 108 virtual network 116. The policy can be useable to define an intended state (e.g., a goal state) for the tenant's 108 virtual network 116. The call can include an identifier for a virtual tap 117. As described above, the identifier 117 may designate that the whole virtual machine is to be tapped, that a specific virtual NIC is to be tapped, or that a collection of IP addresses is to be tapped.

The resource manager 112 passes the call to a scalable software-defined network (SDN) controller 118 and the SDN controller 118 implements a virtual tap 120 via one or more networking components 122 in the host node 104(1) that is supporting the virtual machine 114 (e.g., note that virtual machine 114 in the tenant's virtual network 116 corresponds to virtual machine 106(1) on the physical node 104(1)). In one example, the network component 122 comprises a networking switch (e.g., a virtual switch or vSwitch). The virtual tap 120 is configured to copy data packets communicated to and/or from the virtual machine 114 in association with execution of a workload (e.g., a container being executed) in the tenant's virtual network 116. In FIG. 1, the SDN controller 118 is illustrated on its own node (e.g., device, server, etc.). However, in some embodiments, the SDN controller 118 may reside on one or more of the host nodes 104(1) through 104(N).

In various examples, the networking component 122 is configured to provide virtualized networking functions for the host node 104(1), such as routing, switching, bridging, firewall functions, network address translation (NAT), encap/decap, load balancing, Dynamic Host Configuration Protocol (DHCP), name resolution service (e.g., DNS resolution), and other virtualized networking functions. In some examples, a hairpin feature of the networking component 122 is used to make a copy of an original data packet. The original data packet can be encapsulated using VXLAN in the address space of the destination and streamed to a destination IP address. The destination IP address can be an endpoint (e.g., another virtual machine) in the same virtual network (e.g., virtual network 116) or a peer virtual network. In some instances, the virtual network 116 can be an extension of the tenant's 108 own private network 124 (e.g., an on-premises datacenter network).

Figure 2:
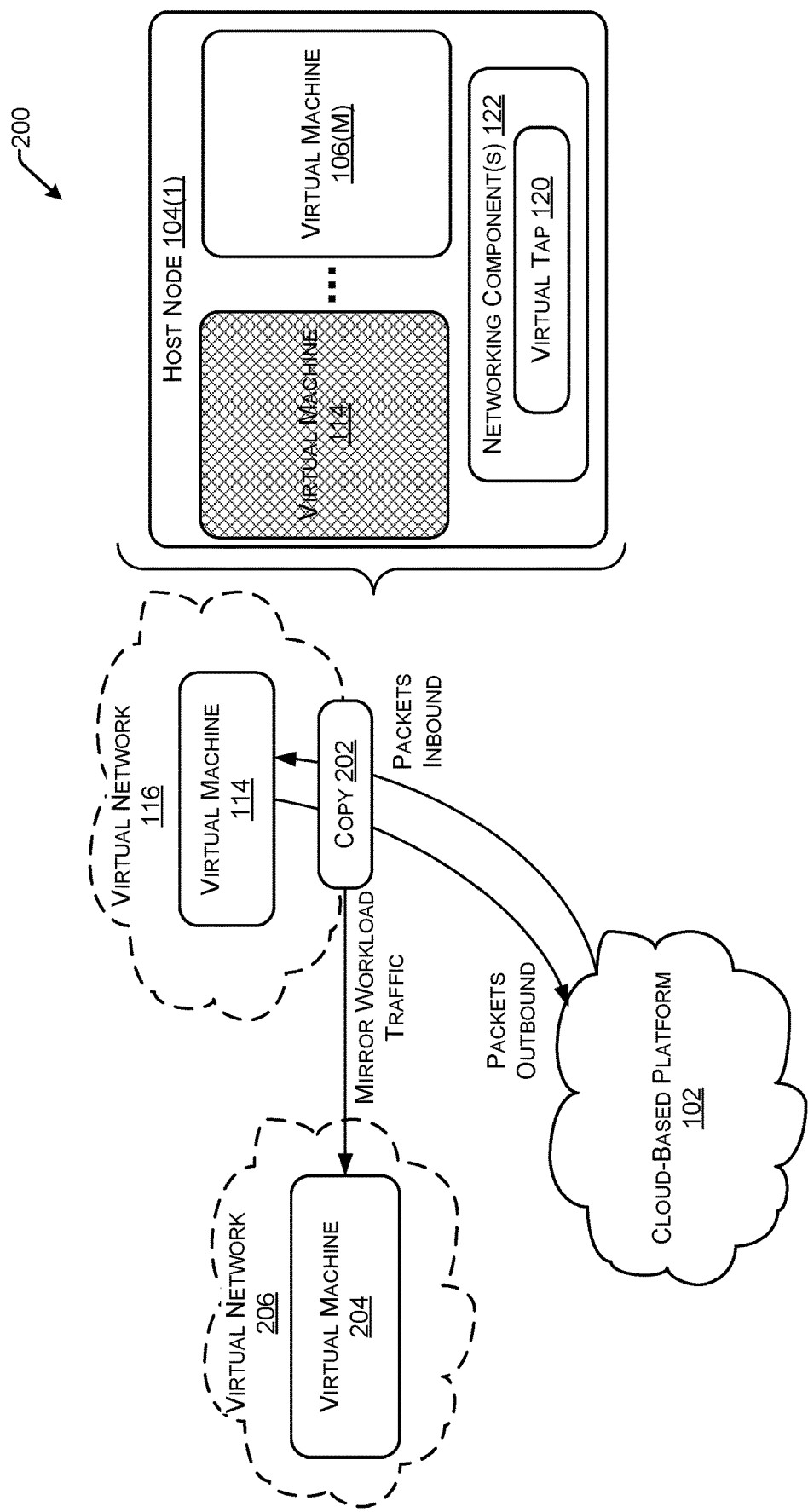
FIG. 2 is a diagram that illustrates an example environment for implementing a virtual tap that mirrors workload traffic for the whole virtual machine executing within a tenant's virtual network.

As shown in the example environment 200 of FIG. 2, the networking component 122 implementing the virtual tap 120 is configured to make a copy of 202 of (i) a data packet sent to the virtual machine 114 (e.g., an inbound packet) from other components in the cloud-based platform 102 (e.g., other virtual machines within, or external to, the tenant's virtual network 116) and/or (ii) a data packet sent from the virtual machine 114 (e.g., an outbound packet) to other components in the cloud-based platform 102. In the example of FIG. 2, the data packets being copied include all the data packets communicated to and/or from the virtual machine 114 based on the tenant call specifying the virtual machine as a whole (e.g., the identifier 117 designates the whole virtual machine). Consequently, the workload traffic is mirrored and the copied data packets are streamed to another virtual machine 204 on another virtual network 206 so that network analytics can be performed (e.g., security analytics, performance analytics, etc.). In some embodiments, the other virtual machine may be executing within the same virtual network as the virtual machine 114 (e.g., virtual network 116).

Figure 3:
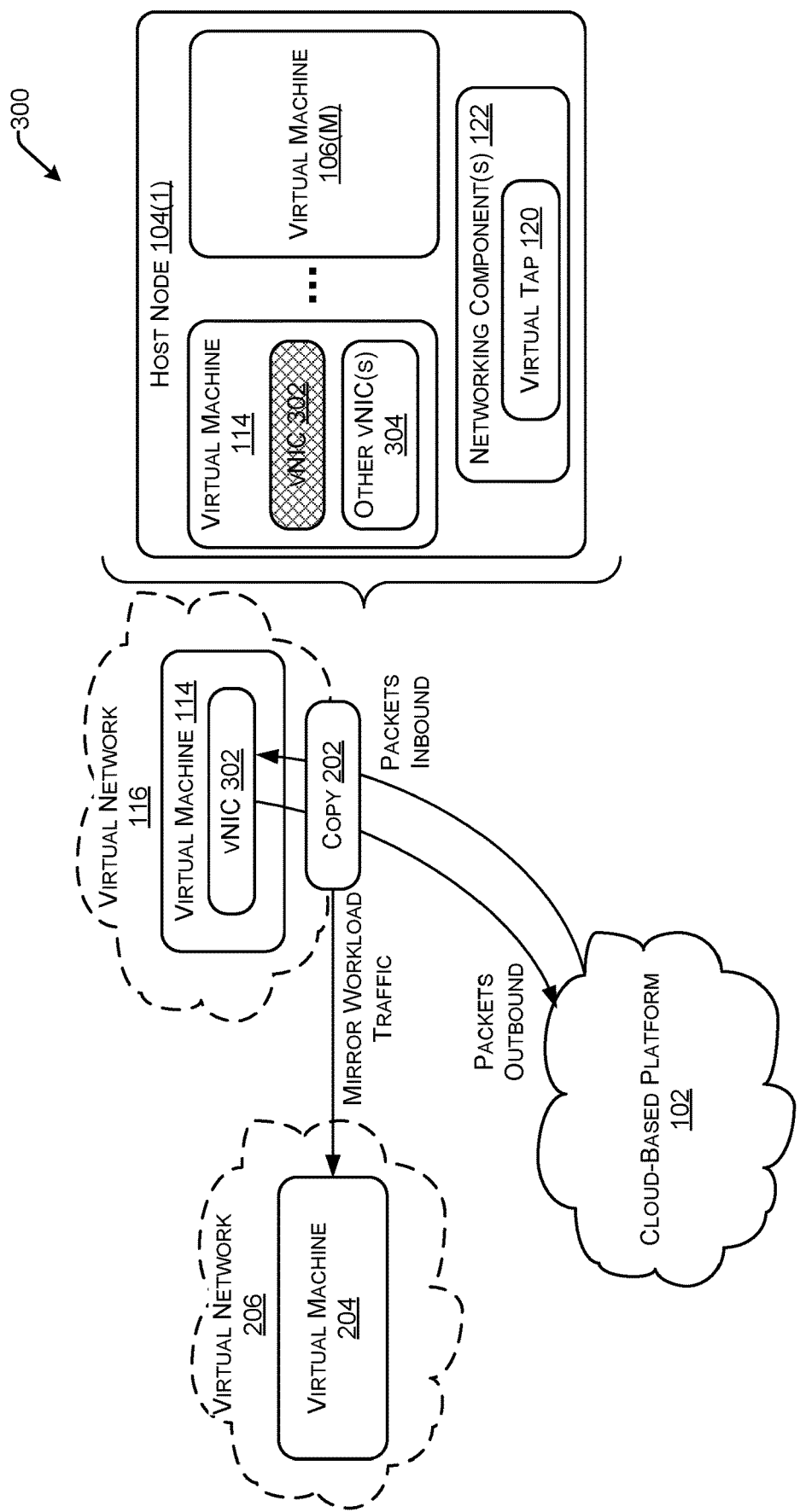
FIG. 3 is a diagram that illustrates an example environment for implementing a virtual tap that mirrors workload traffic for a specific virtual network interface controller of a virtual machine executing within a tenant's virtual network.

The example environment 300 of FIG. 3 is similar to that of FIG. 2 except that the tenant call includes an identifier 117 for a virtual network interface controller (vNIC) 302 of the virtual machine 114. Accordingly, the networking component 122 implementing the virtual tap 120 is configured to make a copy of 202 of (i) a data packet sent to the identified vNIC 302 of the virtual machine 114 (e.g., an inbound packet) from other components in the cloud-based platform 102 and/or (ii) a data packet sent from the identified vNIC 302 of the virtual machine 114 (e.g., an outbound packet) to other components in the cloud-based platform 102. In accordance with the applied policy, traffic communicated to or from the virtual machine 114 via other vNIC(s) 304 is not copied and streamed.

Figure 4:
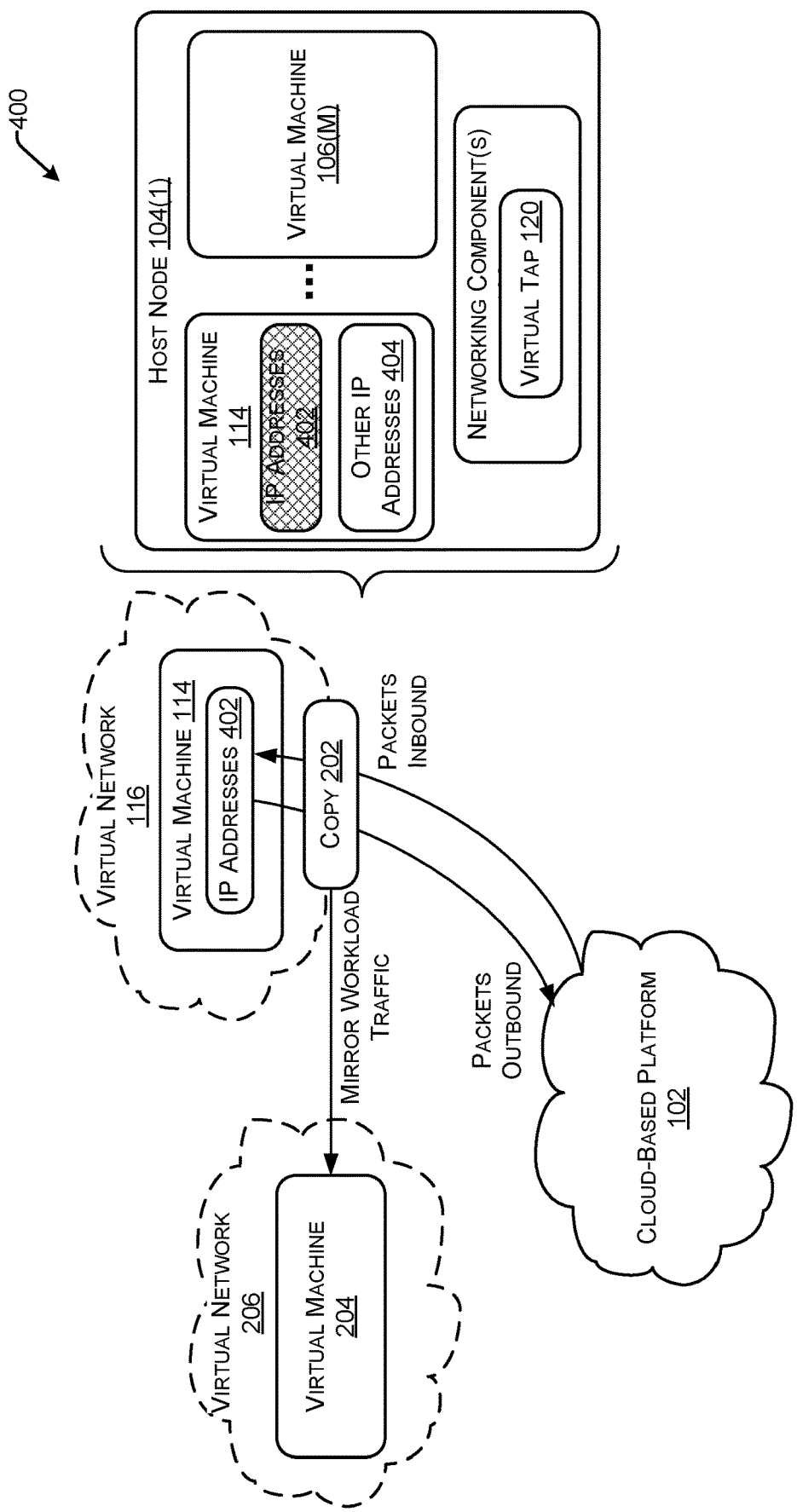
FIG. 4 is a diagram that illustrates an example environment for implementing a virtual tap that mirrors workload traffic for a collection of Internet Protocol (IP) addresses associated with a virtual machine executing within a tenant's virtual network.

The example environment 400 of FIG. 4 is also similar to that of FIG. 2 except that the tenant call includes an identifier 117 for a collection of IP addresses 402 of the virtual machine 114. In one specific example, the collection of IP addresses 402 can be associated with a partition of a virtual NIC assigned to a container executing the workload. Accordingly, the networking component 122 implementing the virtual tap 120 is configured to make a copy of 202 of (i) a data packet sent to the virtual machine 114 via any one IP address in the collection of IP addresses 402 (e.g., an inbound packet) from other components in the cloud-based platform 102 and/or (ii) a data packet sent from the virtual machine 114 via any one IP address in the collection of IP addresses 402 (e.g., an outbound packet) to other components in the cloud-based platform 102. In accordance with the applied policy, traffic communicated to or from the virtual machine 114 via other IP addresses 404 is not copied and streamed.

Figure 5:
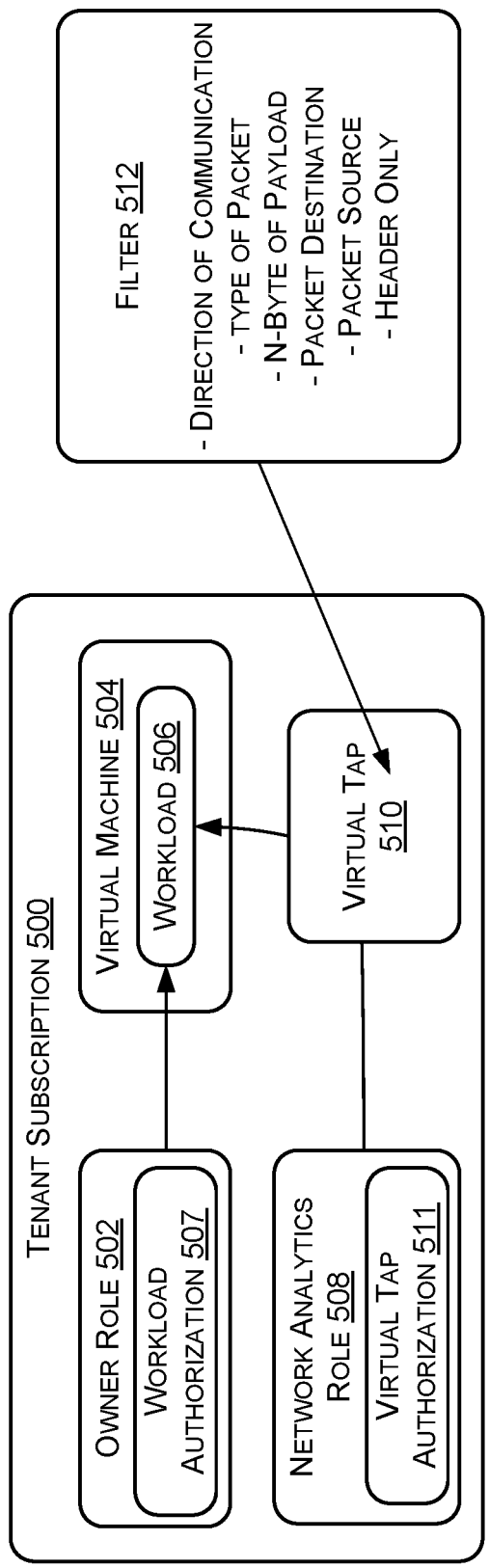
FIG. 5 illustrates an example tenant subscription within which multiple roles can be defined and at least one role is authorized for implementing a virtual tap that mirrors workload traffic of a virtual machine executing within a tenant's virtual network.

FIG. 5 illustrates an example tenant subscription 500 within which multiple roles can be defined. A tenant can establish the multiple roles in association with the subscription with the cloud-based platform. For instance, a first role can comprise an owner role 502. The owner role 502 enables an "owner" of a virtual machine 504 to execute a workload 506 on the virtual machine 504 thereby causing data packets to be communicated to or from the virtual machine 504. Accordingly, the owner role includes workload authorization 507 for a first user to execute the workload 506 on the virtual machine 504.

A second role can comprise a network analytics role 508. The network analytics role 508 enables a security or performance agent to monitor and listen to the network data traffic associated with the workload 506 via a virtual tap 510. Consequently, via the network analytics role 508, the agent is authorized to implement the virtual tap 510. In some examples, implementation of the virtual tap 510 is restricted to the network analytics role 508 and the network analytics role 508 provides the agent with the authority to apply the virtual tap 510 regardless of any policy (e.g., a defined access control list) the owner of the virtual machine 504 establishes to prohibit the virtual tap 510 from being applied.

Consequently, the network analytics role 508 includes virtual tap authorization 511 so visibility into workloads is enabled for analytics operations of a tenant. The remote call requesting application of the policy can include user information (e.g., a user ID, credentials, etc.) that is associated with the virtual tap authorization 511. Before configuring a networking component to apply the policy, the cloud-based platform can evaluate the user information to verify that the user is authorized to apply the policy in association with a defined role.

In various examples, the authorized agent that implements the virtual tap 510 via the network analytics role 508 can request that a filter 512 be applied to the data packets to be copied and streamed. The filter can specify that traffic flowing in a particular direction be copied (e.g., only incoming data packets or packets received by the virtual machine, only outgoing data packets or data packets sent by the virtual machine, etc.). The filter can specify a type of packet to be copied (e.g., TCP/IP data packets). The filter can specify an "N" number of bytes of a packet payload to be copied (e.g., the first 100 bytes), and thus, the copying may not copy the whole data packet. The filter can specify that only data packets being sent to a particular destination be copied. The filter can specify that only data packets received from a particular source be copied. The filter can specify that only a header of a data packet is to be copied. It is noted that the filter can be a combination of any two or more of the conditions listed above. Resources can be saved via the filtering process because not all the data packets may need to be copied and streamed. Moreover, only part of a data packet may need to be copied and streamed.

Figure 6:
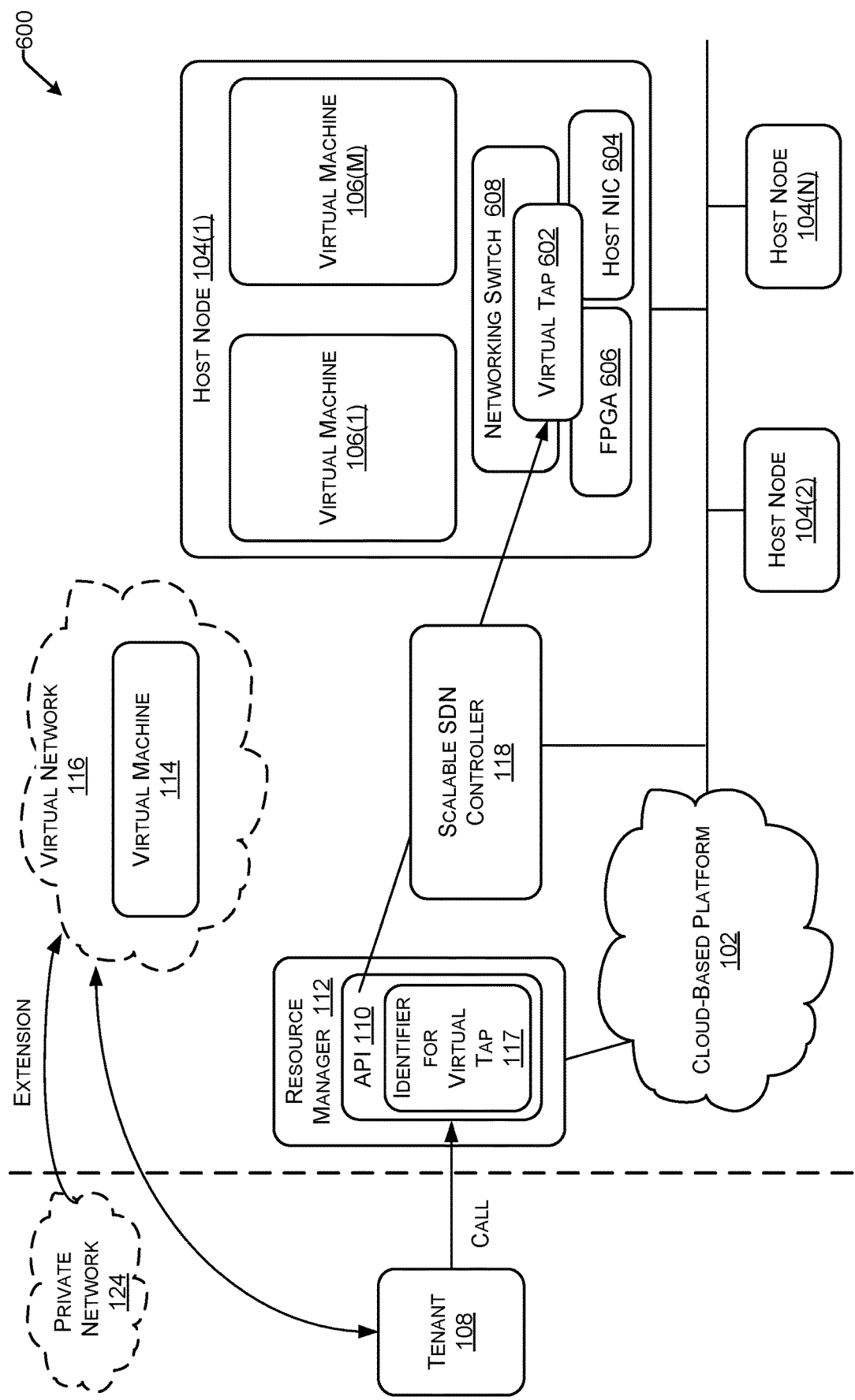
FIG. 6 is a diagram that illustrates another example environment for implementing a virtual tap that mirrors workload traffic of a virtual machine executing within a tenant's virtual network.

In the example environment 600 of FIG. 6, a virtual tap 602 is at least partially implemented in a network interface controller 604 and a Field-Programmable Gate Array 606 (FPGA) of the host node 104(1). In this example, at least part of the mirroring functionality may be offloaded from a networking switch 608 to the host network interface controller 604 and the FPGA 606 in order to improve the performance (e.g., reduce processor cycles on the host node) and reduce the latency associated with mirroring the workload traffic. In various examples, the network interface controller 604 is a programmable smart NIC that, along with the FPGA 606, are placed in the data path of the virtual tap 602. Original data packets sent from a virtual machine can be communicated to the smart NIC 604 and/or to the FPGA 606, where the packet mirroring functionality is performed. In some implementations, the SDN controller 118 instructs the networking switch 608 to apply the policy and the networking switch 608 can program the FPGA 606 to perform the mirroring functionality.

Figure 7A:
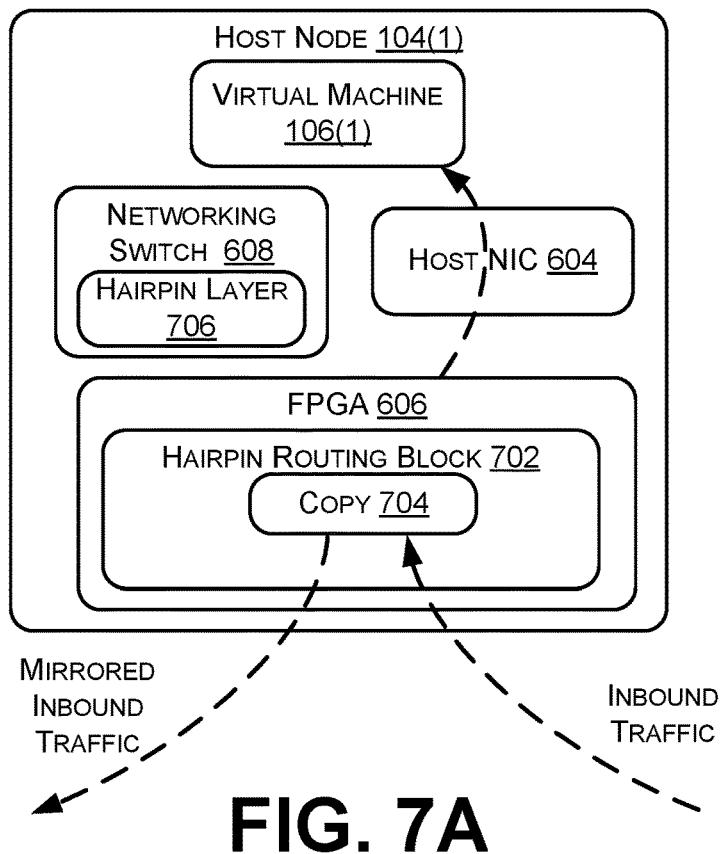
FIG. 7A illustrates example host node networking components that can perform the mirroring functionality described herein in association with inbound traffic.

FIG. 7A illustrates example host node networking components that can perform the mirroring functionality described herein in association with inbound traffic. FIG. 7A illustrates the host NIC 604, the FPGA 606, and the networking switch 608 of FIG. 6. The FPGA 606 is placed in the data path of inbound traffic. The FPGA 606 includes a hairpin routing block 702 that is configured to copy 704 a data packet received in the inbound traffic, and stream the copy 704 of the data packet to a designated virtual machine thereby creating mirrored inbound traffic, as shown in FIG. 7A. Consequently, the hairpin routing block 702 is capable of implementing aspects of the virtual tap. When handling the inbound traffic, the FPGA 606 can process and pass the original data packets to the virtual machine 106(1) via the host NIC 604, without using the networking switch 608. In various examples, the networking switch 608 includes a hairpin layer 706 that can also perform the mirroring functionality. For instance, the inbound traffic may include some data packets which cannot be handled by the FPGA 606

(e.g., exception traffic). These data packets can be passed to the hairpin layer 706 of the networking switch 608, where they can be copied and streamed to another virtual machine.

Figure 7B:
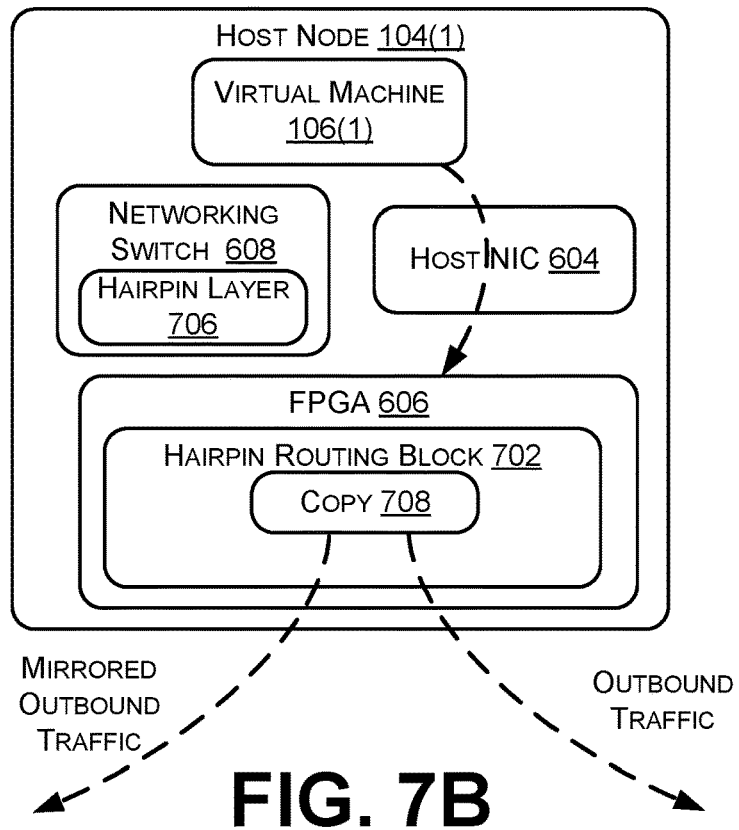
FIG. 7B illustrates example host node networking components that can perform the mirroring functionality described herein in association with outbound traffic.

FIG. 7B illustrates example host node networking components that can perform the mirroring functionality described herein in association with outbound traffic. Like FIG. 7A, FIG. 7B illustrates the host NIC 604, the FPGA 606, and the networking switch 608 of FIG. 6. The FPGA 606 is also placed in the data path of outbound traffic. The hairpin routing block 702 can also be configured to copy 708 a data packet being sent in the outbound traffic, and stream the copy 708 of the data packet to a designated virtual machine thereby creating mirrored outbound traffic, as shown in FIG. 7B. When handling the outbound traffic, the FPGA 606 can process the original data packets and send them to their respective destinations (e.g., other virtual machines), without using the networking switch 608.

In accordance with FIGS. 7A and 7B, the FPGA 606 can be programmed to apply a policy that copies data packets communicated to a virtual machine being supported by a host node. In some instances, the FPGA 606 can be programmed by the networking switch 608 to perform the mirroring functionality in accordance with the policy. The FPGA 606 can then apply the policy and determine that a data packet is communicated to or from the virtual machine. In accordance with application of the policy, the FPGA 606 can create a copy of the data packet and transmit the copy of the data packet to another virtual machine so that network analytics can be performed.

In further embodiments, the techniques can configure a gateway (e.g., a VPN gateway, an application gateway, an express route gateway, etc.) within a tenant's virtual network and place a virtual tap on the gateway. This virtual tap is configured to capture and/or copy traffic coming into the tenant's virtual network and/or going out of the tenant's virtual network via any one of multiple virtual machines in the tenant's virtual network. This virtual tap may be used when the tenant is not concerned about traffic communicated solely within their own virtual network (e.g., data packets sent between two virtual machines), but rather, when the tenant is concerned about traffic communicated between a private network of the tenant (e.g., an on-premises datacenter network) and the tenant's virtual network in the cloud.

Figure 8:
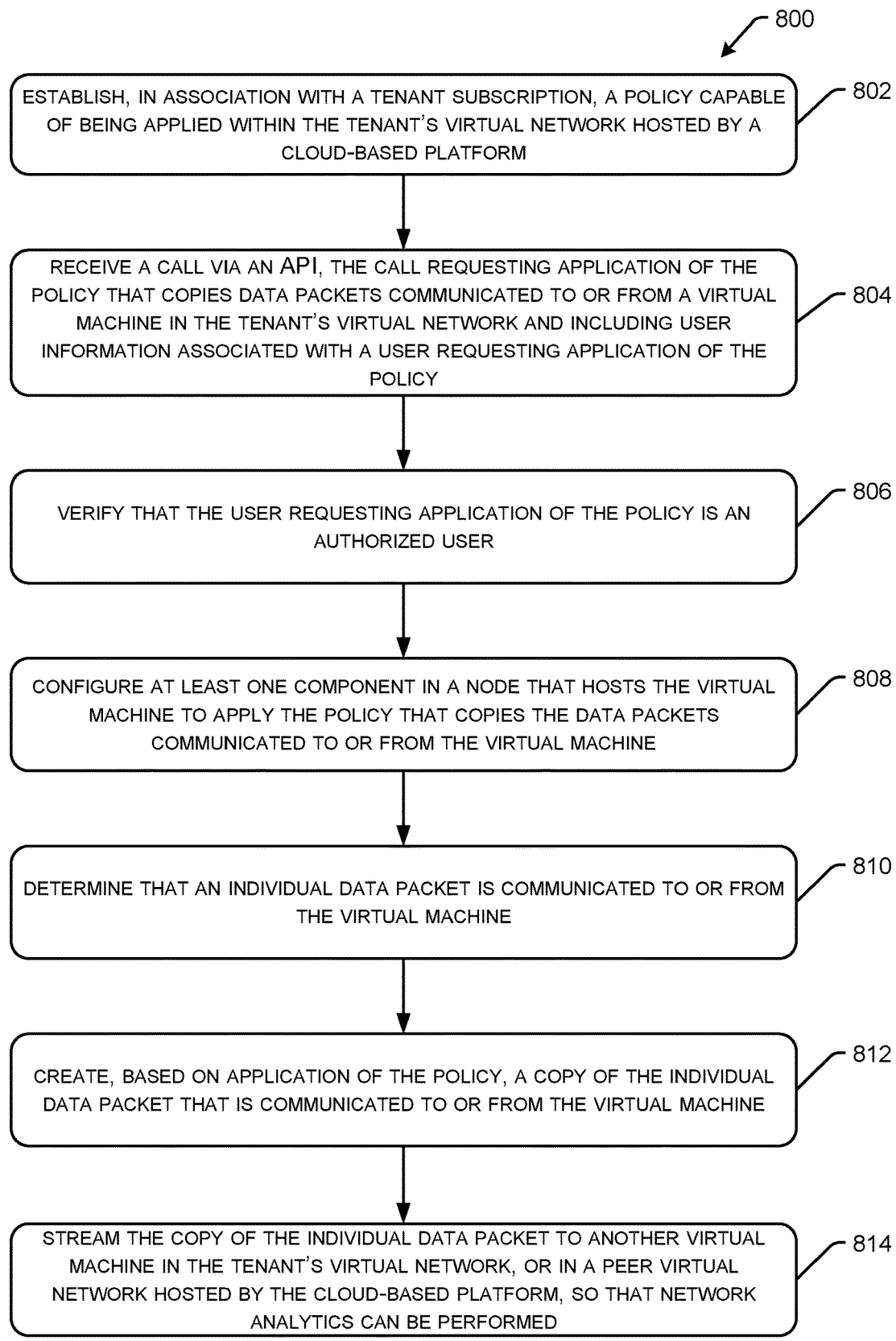
FIG. 8 is a flowchart that illustrates operations for implementing a virtual tap that mirrors workload traffic of a virtual machine executing within a tenant's virtual network.

FIG. 8 illustrates an example flowchart. It should be understood by those of ordinary skill in the art that the operations of the method(s) disclosed herein are not necessarily presented in any particular order and that performance of some or all of the operations in alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated method(s) can end at any time and need not be performed in their entirety. Some or all operations of the method(s), and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 8 is a flowchart 800 that illustrates operations for implementing a virtual tap that mirrors workload traffic of a virtual machine executing within a tenant's virtual network.

At operation 802, a policy capable of being applied within a virtual network hosted by a cloud-based platform is established in association with a tenant subscription. As described above, the policy may be a role-based mirroring policy that defines a first role for an owner of a virtual machine to execute a workload, on the virtual machine, that causes data packets to be communicated to or from the virtual machine. Moreover, the role-based mirroring policy may define a second role for an authorized agent to monitor the workload.

At operation 804, the cloud-based platform (e.g., the resource manager 112) receives a remote call via an application programming interface (API). The remote call requests application of the policy that copies data packets communicated to or from a virtual machine in the tenant's virtual network hosted by the cloud-based platform. Moreover, the remote call includes user information (e.g., identification information, credentials such as a password or biometric data, etc.) associated with a user requesting application of the policy.

At operation 806, the cloud-based platform (e.g., the resource manager 112) verifies, based on the user information, that the user requesting application of the policy is a user that is authorized to implement a virtual tap on the virtual machine. As described above, the authorization is provided via a role established by the tenant in association with a tenant subscription.

At operation 808, the cloud-based platform (e.g., the SDN controller 118) configures at least one component in a node that hosts the virtual machine to apply the policy that copies the data packets communicated to or from the virtual machine.

At operation 810, the cloud-based platform (e.g., the component such as a networking switch, a network interface controller, or a FPGA) determines that an individual data packet is communicated to or from the virtual machine.

At operation 812, the cloud-based platform (e.g., the component such as a networking switch, a network interface controller, or a FPGA) creates, based on application of the policy, a copy of the individual data packet that is communicated to or from the virtual machine.

At operation 814, the cloud-based platform (e.g., the component such as a networking switch, a network interface controller, or a FPGA) streams the copy of the individual data packet to another virtual machine in the virtual network, or in a peer virtual network hosted by the cloud-based platform, so that network analytics can be performed on data traffic.

Figure 9:
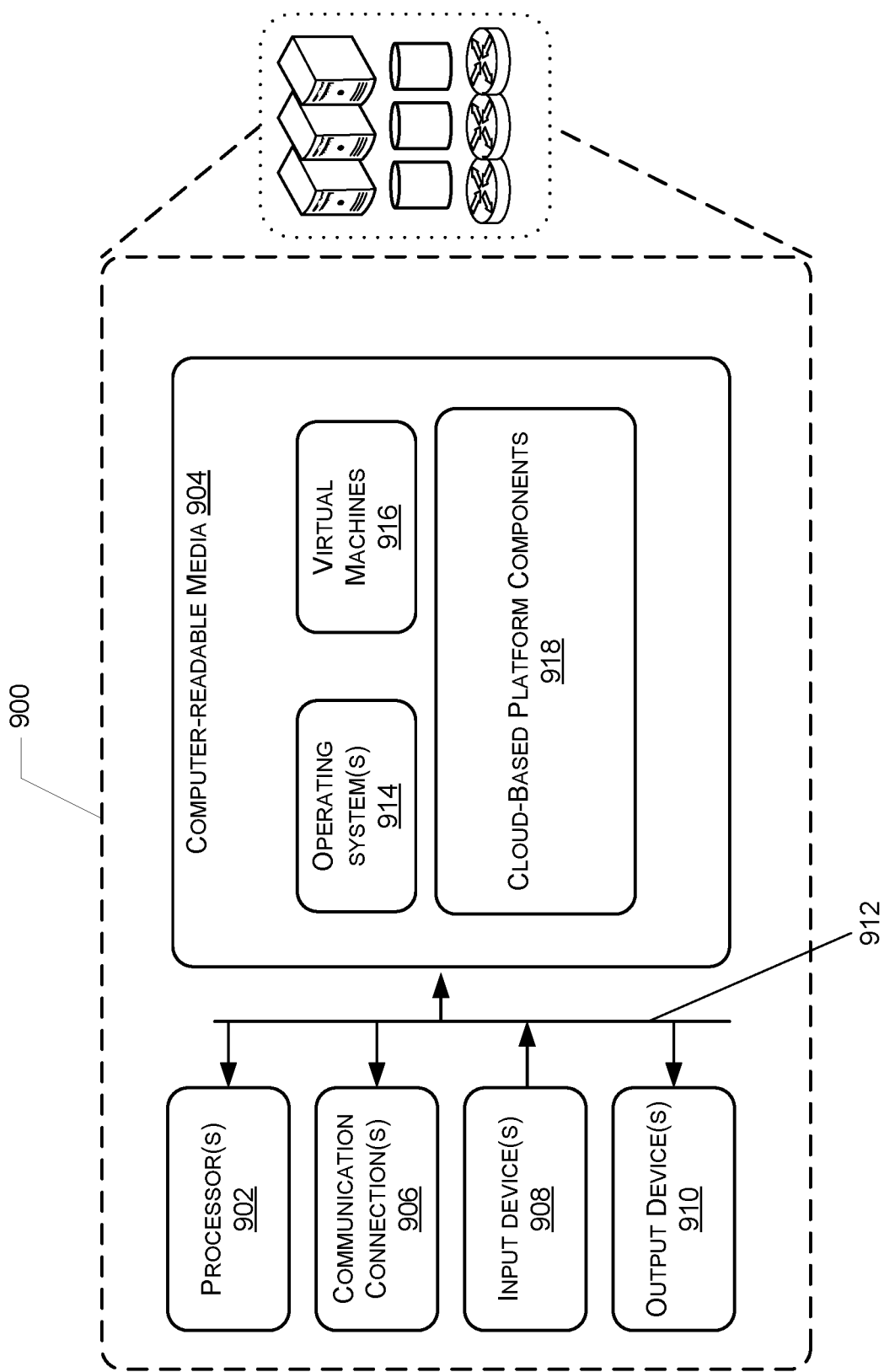
FIG. 9 is a block diagram of an example computing system usable to implement various aspects of the present disclosure.

FIG. 9 is a block diagram of an example computing system 900 usable to implement various aspects of the present disclosure. The computing system 900 may be deployed in a shared network environment, including in a datacenter, a cloud computing environment, or other network of computing devices. In one example configuration, the computing system 900 comprises at least one processor 902 and computer-readable media 904. The computing system 900 also contains communication connection(s) 906 that allow communications with various other systems. The computing system 900 may also include one or more input devices 908, such as a keyboard, mouse, pen, voice input device, touch input device, etc., and/or one or more output devices 910, such as a display (including a touch-screen display), speakers, printer, etc. coupled communicatively to the processor(s) 902 and the computer-readable media 904 via connections 912.

In the illustrated example, computer-readable media 904 stores operating system(s) 914, which provide basic system functionality to virtual machines 916 (which may be the same as or similar to one or more of virtual machines described above) and/or other cloud-based platform components 918 (e.g., the networking switch, the SDN controller, the resource manager, APIs, NICs, FPGAs, etc.).

The operations described herein can be implemented via computer-executable instructions stored on one or more computer storage media that, when executed by one or more processors, enable the one or more processors to perform the operations. Generally, computer-executable instructions include routines, programs, objects, modules, components, data structures, and the like that perform particular functions or implement particular abstract data types.

According to various examples, the computing systems described herein includes one or more devices, such as servers, storage devices, and other cloud-based platform devices. Computer-readable media 904 stores computer-executable instructions that are loadable and executable by one or more processor(s), as well as data generated during execution of, and/or usable in conjunction with, these programs. In the illustrated example, computer-readable media stores operating system instances, which provide basic system functionality to applications stored thereon. One or more of these components, including the operating systems, may be instantiated as virtual machines, containers, or as some other type of virtualized instantiation.

Processor(s) 902 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-Programmable Gate Arrays (FPGAs), Application-Specific Integrated Circuits (ASIC s), Application-Specific Standard Products (ASSPs), System-on-a-Chip Systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. Different processing units may have different execution models, e.g., as is the case for graphics processing units (GPUs) and central processing units (CPUs).

Depending on the configuration and type of computing device used, computer-readable media include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via network interface hardware. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

ILLUSTRATIVE CONFIGURATIONS

The following clauses described multiple possible configurations for implementing the features described in this disclosure. The various configurations described herein are not limiting nor is every feature from any given configuration required to be present in another configuration. Any two or more of the configurations may be combined together unless the context clearly indicates otherwise. As used herein in this document "or" means and/or. For example, "A or B" means A without B, B without A, or A and B. As used herein, "comprising" means including listed all features and potentially including addition of other features that are not listed.

The disclosure presented herein also encompasses the subject matter set forth in the following clauses.

Example Clause A, a system comprising: one or more processors; and computer-readable media storing instructions that, when executed by the one or more processors, cause the system to: establish, in association with a tenant subscription, a role-based mirroring policy capable of being applied within a virtual network hosted by a cloud-based platform, the role-based mirroring policy defining at least: a first role for an owner of a virtual machine to execute a workload, on the virtual machine, that causes data packets to be communicated to or from the virtual machine; and a second role for an authorized agent to monitor the workload; receive a remote call via an application programming interface (API) configured as part of the cloud-based platform, wherein the remote call requests application of the role-based mirroring policy to the workload executing on the virtual machine, wherein the remote call includes user information associated with a user requesting application of the role-based mirroring policy; verify, based on the user information, that the user requesting application of the role-based mirroring policy is associated with the second role; configure at least one component in a host node of the cloud-based platform that hosts the virtual machine to apply the role-based mirroring policy; determine, by the at least one component, that an individual data packet is communicated to or from the virtual machine; create, by the at least one component and based on application of the role-based mirroring policy, a copy of the individual data packet that is communicated to or from the virtual machine; and stream the copy of the individual data packet to another virtual machine in the virtual network, or in a peer virtual network hosted by the cloud-based platform, so that network analytics can be performed on data traffic.

Example Clause B, the system of Example Clause A, wherein the authorized agent comprises the user.

Example Clause C, the system of Example Clause A or Example Clause B, wherein the remote call specifies an identifier for the virtual machine such that the policy is applied to all data packets communicated to or from the virtual machine.

Example Clause D, the system of Example Clause A or Example Clause B, wherein the remote call specifies an identifier for a virtual network interface controller of the virtual machine such that the policy is applied to data packets communicated to or from the virtual machine via the virtual network interface controller.

Example Clause E, the system of Example Clause A or Example Clause B, wherein the remote call specifies an identifier for a collection of Internet Protocol (IP) addresses used by the virtual machine such that the policy is applied to data packets communicated to or from the virtual machine via an IP address in the collection of IP addresses.

Example Clause F, the system of Example Clause E, wherein the collection of IP addresses is an extension of an IP address space used in a private network operated by a tenant of the cloud-based platform.

Example Clause G, the system of any one of Example Clauses A through F, wherein the remote call requests that the policy apply a filter to the data packets communicated to or from the virtual machine, the filter specifying one or more of: a direction of traffic to be copied; a type of packet to be copied; a number of bytes of a packet payload to be copied; a destination to which packets to be copied are sent; a source from which packets to be copied are received; or that only a packet header is to be copied.

Example Clause H, the system of any one of Example Clauses A through G, wherein the copy of the individual data packet comprises a full copy.

Example Clause I, the system of any one of Example Clauses A through H, wherein the at least one component comprises at least one of a software defined networking switch, a network interface controller, or a Field-Programmable Gate Array.

Example Clause J, the system of any one of Example Clauses A through I, wherein the policy is useable to define an intended state of the virtual network for a tenant of the cloud-based platform, the virtual network belonging to the tenant.

Example Clause K, a method comprising: receiving a remote call via an application programming interface (API) configured as part of a cloud-based platform, wherein the remote call requests application of a policy that copies data packets communicated to or from a virtual machine in a virtual network hosted by the cloud-based platform and wherein the remote call includes user information associated with a user requesting application of the policy; verifying, by one or more processors and based on the user information, that the user is authorized to apply the policy that copies data packets communicated to or from the virtual machine; determining that an individual data packet is communicated to or from the virtual machine; and transmitting, in accordance with the policy, a copy of the individual data packet to another virtual machine in the virtual network, or in a peer virtual network hosted by the cloud-based platform, so that network analytics can be performed on data traffic.

Example Clause L, the method of Example Clause K, wherein: the policy is a role-based mirroring policy; the API receives the remote call in association with a tenant subscription that enables the role-based mirroring policy to be applied to the data packets communicated to or from the virtual machine; and the role-based mirroring policy defines a plurality of roles, a first role for a first user to execute a workload on the virtual machine that causes the data packets to be communicated to or from the virtual machine and a second role for a second user to monitor the workload.

Example Clause M, the method of Example Clause L, wherein the user that requests application of the policy comprises the second user.

Example Clause N, the method of any one of Example Clauses K through M, wherein the remote call specifies an identifier for the virtual machine such that the policy is applied to all data packets communicated to or from the virtual machine.

Example Clause O, the method of any one of Example Clauses K through M, wherein the remote call specifies an identifier for a virtual network interface controller of the virtual machine such that the policy is applied to data packets communicated to or from the virtual machine via the virtual network interface controller.

Example Clause P, the method of any one of Example Clauses K through M, wherein the remote call specifies an identifier for a collection of Internet Protocol (IP) addresses used by the virtual machine such that the policy is applied to data packets communicated to or from the virtual machine via an IP address in the collection of IP addresses.

Example Clause Q, a device comprising a Field-Programmable Gate Array programmed to apply a policy that copies data packets communicated to a virtual machine being hosted by the device, the policy including instructions that, when executed, cause the Field-Programmable Gate Array to: determine that an individual data packet is communicated to the virtual machine; create a copy of the individual data packet that is communicated to the virtual machine; and transmit the copy of the individual data packet to another virtual machine so that network analytics can be performed on data traffic.

Example Clause R, the device of Example Clause Q, wherein the creating and the transmitting are performed by a hairpin routing block configured in the Field-Programmable Gate Array.

Example Clause S, the device of Example Clause Q or Example Clause R, wherein: the policy is a role-based mirroring policy established in association with a tenant subscription that enables the role-based mirroring policy to be applied to the data packets communicated to the virtual machine; and the role-based mirroring policy defines a plurality of roles, a first role for a first user to execute a workload on the virtual machine that causes the data packets to be communicated to the virtual machine and a second role for a second user to monitor the workload.

Example Clause T, the device of any one of Example Clauses Q through S, wherein the policy is applied to one of: all data packets communicated to the virtual machine; data packets communicated to the virtual machine via a specific virtual network interface controller; or data packets communicated to the virtual machine via an Internet Protocol (IP) address that is part of a collection of IP addresses.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different virtual machines, etc.).

Certain configurations are described herein, including the best mode known to the inventors for carrying out the invention. Of course, variations on these described configurations will become apparent to those of ordinary skill in the art upon reading the foregoing description. Skilled artisans will know how to employ such variations as appropriate, and the configurations disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:
1. A system comprising:
one or more hardware processors; and
computer-readable media storing instructions that, when executed by the one or more hardware processors, cause the system to:
    establish, in association with a tenant subscription, a role-based mirroring policy capable of being applied within a virtual network hosted by a cloud-based platform, the role-based mirroring policy defining at least:
        a first role for an owner of a virtual machine to execute a workload, on the virtual machine, that causes data packets to be communicated to or from the virtual machine; and
        a second role for an authorized agent to monitor the workload;
    receive a remote call via an application programming interface (API) configured as part of the cloud-based platform, wherein the remote call requests application of the role-based mirroring policy to the workload executing on the virtual machine, wherein the remote call includes user information associated with a user requesting application of the role-based mirroring policy;
    verify, based on the user information, that the user requesting application of the role-based mirroring policy is associated with the second role;
    configure at least one component in a host node of the cloud-based platform that hosts the virtual machine to apply the role-based mirroring policy;
    determine, by the at least one component, that an individual data packet is communicated to or from the virtual machine;
    create, by the at least one component and based on application of the role-based mirroring policy, a copy of the individual data packet that is communicated to or from the virtual machine; and
    stream the copy of the individual data packet to another virtual machine in the virtual network, or in a peer virtual network hosted by the cloud-based platform, so that network analytics can be performed on data traffic.

2. The system of claim 1, wherein the authorized agent comprises the user.

3. The system of claim 1, wherein the remote call specifies an identifier for the virtual machine such that the policy is applied to all data packets communicated to or from the virtual machine.

4. The system of claim 1, wherein the remote call specifies an identifier for a virtual network interface controller of the virtual machine such that the policy is applied to data packets communicated to or from the virtual machine via the virtual network interface controller.

5. The system of claim 1, wherein the remote call specifies an identifier for a collection of Internet Protocol (IP) addresses used by the virtual machine such that the policy is applied to data packets communicated to or from the virtual machine via an IP address in the collection of IP addresses.

6. The system of claim 5, wherein the collection of IP addresses is an extension of an IP address space used in a private network operated by a tenant of the cloud-based platform.

7. The system of claim 1, wherein the remote call requests that the policy apply a filter to the data packets communicated to or from the virtual machine, the filter specifying one or more of:
a direction of traffic to be copied;
a type of packet to be copied;
a number of bytes of a packet payload to be copied;
a destination to which packets to be copied are sent;
a source from which packets to be copied are received; or
that only a packet header is to be copied.

8. The system of claim 1, wherein the copy of the individual data packet comprises a full copy.

9. The system of claim 1, wherein the at least one component comprises at least one of a software defined networking switch, a network interface controller, or a Field-Programmable Gate Array.

10. The system of claim 1, wherein the policy is useable to define an intended state of the virtual network for a tenant of the cloud-based platform, the virtual network belonging to the tenant.

11. A method comprising:
receiving a remote call via an application programming interface (API) configured as part of a cloud-based platform, wherein:
the remote call requests application of a role-based mirroring policy that copies data packets communicated to or from a virtual machine in a virtual network hosted by the cloud-based platform;
the role-based mirroring policy defines a first role for a first user to execute a workload that causes the data packets to be communicated to or from the virtual machine and a second role for a second user to monitor the workload; and
the remote call includes user information associated with the second user requesting application of the role-based mirroring policy;
verifying, by one or more processors and based on the user information, that the second user is authorized to apply the role-based mirroring policy that copies data packets communicated to or from the virtual machine;
determining that an individual data packet is communicated to or from the virtual machine; and
transmitting, in accordance with the role-based mirroring policy, a copy of the individual data packet to another virtual machine in the virtual network, or in a peer virtual network hosted by the cloud-based platform, so that network analytics can be performed on data traffic.

12. The method of claim 11, wherein the API receives the remote call in association with a tenant subscription that enables the role-based mirroring policy to be applied to the data packets communicated to or from the virtual machine.

13. The method of claim 11, wherein the remote call specifies an identifier for the virtual machine such that the role-based mirroring policy is applied to all data packets communicated to or from the virtual machine.

14. The method of claim 11, wherein the remote call specifies an identifier for a virtual network interface controller of the virtual machine such that the role-based mirroring policy is applied to data packets communicated to or from the virtual machine via the virtual network interface controller.

15. The method of claim 11, wherein the remote call specifies an identifier for a collection of Internet Protocol (IP) addresses used by the virtual machine such that the role-based mirroring policy is applied to data packets communicated to or from the virtual machine via an IP address in the collection of IP addresses.

16. A system comprising:
one or more hardware processors; and
computer-readable media storing instructions that, when executed by the one or more hardware processors, cause the system to:
receive a remote call via an application programming interface (API) configured as part of a cloud-based platform, wherein:
the remote call requests application of a role-based mirroring policy that copies data packets communicated to or from a virtual machine in a virtual network hosted by the cloud-based platform;
the role-based mirroring policy defines a first role for a first user to execute a workload that causes the data packets to be communicated to or from the virtual machine and a second role for a second user to monitor the workload; and
the remote call includes user information associated with the second user requesting application of the role-based mirroring policy;
verify, based on the user information, that the second user is authorized to apply the role-based mirroring policy that copies data packets communicated to or from the virtual machine;
determine that an individual data packet is communicated to or from the virtual machine; and
transmit, in accordance with the role-based mirroring policy, a copy of the individual data packet to another virtual machine in the virtual network, or in a peer virtual network hosted by the cloud-based platform, so that network analytics can be performed on data traffic.

17. The system of claim 16, wherein the remote call specifies an identifier for the virtual machine such that the role-based mirroring policy is applied to all data packets communicated to or from the virtual machine.

18. The system of claim 16, wherein the remote call specifies an identifier for a virtual network interface controller of the virtual machine such that the role-based mirroring policy is applied to data packets communicated to or from the virtual machine via the virtual network interface controller.

19. The system of claim 16, wherein the remote call specifies an identifier for a collection of Internet Protocol (IP) addresses used by the virtual machine such that the role-based mirroring policy is applied to data packets communicated to or from the virtual machine via an IP address in the collection of IP addresses.

20. The system of claim 16, wherein the API receives the remote call in association with a tenant subscription that enables the role-based mirroring policy to be applied to the data packets communicated to or from the virtual machine.

* * * * *